(12) United States Patent
Vaughn et al.

(10) Patent No.: US 8,750,611 B1
(45) Date of Patent: Jun. 10, 2014

(54) IN-SCENE BALANCING OF REMOTELY SENSED AND AERIAL MULTIBAND IMAGERY

(75) Inventors: Michael A. Vaughn, North Chili, NY (US); Erin P. K. Fredericks, Fairport, NY (US); Stacey E. Casella, Macedon, NY (US); Blake P. Jabieski, Rochester, NY (US)

(73) Assignee: Exelis Inc., McLean, VA (US)

( * ) Notice: Subject to any disclaimer, the term of this patent is extended or adjusted under 35 U.S.C. 154(b) by 127 days.

(21) Appl. No.: 13/408,357

(22) Filed: Feb. 29, 2012

(51) Int. Cl.
*G06K 9/00* (2006.01)

(52) U.S. Cl.
USPC .......................... 382/167; 375/240.2; 382/270

(58) Field of Classification Search
USPC ................. 375/240.2; 382/100, 167, 260, 299
See application file for complete search history.

(56) References Cited

U.S. PATENT DOCUMENTS

| | | | |
|---|---|---|---|
| 6,243,133 B1 | 6/2001 | Spaulding et al. | |
| 6,694,064 B1 * | 2/2004 | Benkelman | 382/284 |
| 7,158,174 B2 | 1/2007 | Gindele et al. | |
| 7,587,097 B2 * | 9/2009 | Truitt et al. | 382/254 |
| 7,660,430 B2 * | 2/2010 | Navulur et al. | 382/100 |
| 7,680,192 B2 * | 3/2010 | Kaplinsky | 375/240.2 |
| 7,936,949 B2 * | 5/2011 | Riley et al. | 382/299 |
| 8,432,974 B2 * | 4/2013 | Chen | 375/240.19 |
| 2002/0114533 A1 * | 8/2002 | Smith et al. | 382/275 |
| 2005/0273011 A1 * | 12/2005 | Hattery et al. | 600/476 |
| 2010/0142842 A1 * | 6/2010 | Damkjer et al. | 382/260 |

OTHER PUBLICATIONS

Updike et al., "Radiometric Use of WorldView-2 Imagery", Technical Note, DigitalGlobe, Inc., Nov. 1, 2010, (pp. 1-17).

* cited by examiner

*Primary Examiner* — Gregory M Desire
(74) *Attorney, Agent, or Firm* — Edell, Shapiro & Finnan, LLC (57) ABSTRACT

Techniques are provided for an image processing device to receive image data from a remotely positioned sensor. Spectral bands within the image data are equalized. High and low resolution images are obtained from the equalized image and are used to ultimately generate a color separation space. The color separation space is used to determine balance positions or spatial locations on the axes of the color separation space. The balance positions are converted to a red-green-blue (RGB) triplet that is used to calculate band or channel balance gains. The channel balance gains are then applied to an original image obtained from the image data.

21 Claims, 9 Drawing Sheets

IN-SCENE BALANCING OF REMOTELY SENSED AND AERIAL MULTIBAND IMAGERY

BACKGROUND

Color digital imaging devices generally utilize an array of color sensors to capture the digital image information. The sensors typically have spectral sensitivities that correspond roughly to the red, green and blue (RGB) portions of the visible spectrum. The sensitivities will vary slightly from one manufacturer to another. Alternatively, sensors with other spectral sensitivities such as cyan, magenta and yellow (CMY), or cyan, magenta, yellow and green have also been used. The exposure values captured by the color sensors are usually converted to an integer value to form quantized color values (intensity values) and stored in memory for later processing. Later processing typically includes color correction, image sharpening and noise removal.

Digital imaging devices are typically designed so that a neutral position or gray patch in the subject area of the image should be encoded with specified code values, i.e., gray balancing is performed on the image. For digital cameras, some type of exposure meter is typically used to determine a lens aperture and exposure time setting that is appropriate for the level of scene illumination. When an electronic flash is used, the flash exposure level is also typically controlled using some form of exposure meter. Other types of digital imaging devices may utilize other forms of exposure control.

Exposure errors can cause the gray patch to come out at code values that are lower or higher than expected. Typical causes of exposure errors are scenes that are dominated by dark or light objects, and scenes where the subject and the background have significantly different exposure levels. For example, photographs will generally have exposure errors when taken with back-lit scenes where the background is brighter than the subject or when taken with flash-lit scenes where the background is at a much larger distance than the subject.

In addition to exposure level errors, color balance errors can also be introduced by variations in the spectral content of the scene illumination. Conventional digital imaging devices are designed so that equal color signals will be generated for neutral scene objects. Color balance errors cause the relative proportions of the color signals for a neutral scene object to deviate from the expected value. For example, if a digital camera is calibrated so that equal red, green, and blue color signals are obtained when a neutral object is photographed with typical daylight illumination, non-equal color signals will generally result when the neutral object is photographed under artificial illumination, e.g., incandescent or florescent lamps.

Scene balance algorithms typically work by analyzing the distribution of overall exposure levels and relative color values in an image to determine the appropriate level of exposure and color balance compensation that is needed. Frequently, these algorithms work by first computing a low-resolution version of the image and then analyzing that image. The low-resolution image is sometimes referred to as a "paxelized" image. The term "paxel" is used to indicate a color value determined by averaging the color values for a group of pixels.

Scene balance algorithms can also be used for digital imaging devices. In this case, the scene balance algorithms must typically be tuned to the color response characteristics of a particular digital imaging device. For example, different digital film scanners or cameras will have different sensor spectral sensitivities. Therefore, the distribution of code values associated with a particular image will be a function of the digital imaging device that is used to capture the image, and different scene balancing algorithms are used accordingly.

The scene balancing algorithm converts the image to a color space that enables it to be properly distinguished between what is illuminant (light source) and what is actual scene content. After the color space transformation is performed, a low resolution version of the image is created and a statistics based approach is used to determine how far away from a specified neutral position (gray patch) the captured image is. Based on the difference between the captured image and the specified neutral difference, color balance gains are created and the subsequently applied to the captured image.

The above method tends to incorrectly discern between illuminant and scene content for imagery that is captured with devices that are a further away from the target or scene to be captured than what would be experienced with scene capture from a standard digital camera. Since the above method was developed primarily for hand-held digital cameras, the method produces sub-standard imagery when capturing remotely-sensed or aerial imagery, e.g., atmospheric effects are not accounted for. In addition, the above method applies a look-up table to prepare the imagery for the application of calculated balance gains. This additional look-up table is not necessary for remotely sensed and aerial imagery, and therefore may yield in inferior results.

In light of the shortcomings of these and other techniques, the need has been felt for a technique to perform in-scene balancing of remotely sensed and aerial multiband images.

SUMMARY

Described herein is a technique to overcome issues that arise due to both the atmospheric effects and the make-up of devices that capture remotely sensed or aerial multiband imagery. The technique preprocesses the imagery by applying a band equalization process to the imagery in order to help distinguish between what is illuminant and what is scene content. The band equalization process places the energy of the bands in the proper place with respect to each other, thereby allowing the image balance processing to function as designed. In addition, the techniques described herein remove the additional look-up table operations present in tradition image processing algorithms. For the remotely sensed and aerial multiband imagery, the removal of look-up table operations has no adverse impact on image quality.

The techniques provide for an image processing device to receive image data from a remotely positioned sensor. Spectral bands within the image data are equalized. High and low resolution images are obtained from the equalized image and are used to ultimately generate a color separation space. The color separation space is used to determine balance positions or spatial locations on the axes of the color separation space. The balance positions are converted to a red-green-blue (RGB) triplet that is used to calculate band or channel balance gains. The channel balance gains are then applied to an original image obtained from the image data.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations

BRIEF DESCRIPTION OF THE DRAWINGS

FIG. 2b is a schematic block diagram of sub-modules of one of the functional modules from FIG. 2a.

FIG. 4b is a graph of an inverse logarithmic transform of the logarithmic transform from FIG. 4a.

DETAILED DESCRIPTION

Described herein is a technique for an image processing device to receive image information comprising image data for two or more spectral bands. An original image is obtained from the image information and equalized across spectral bands to produce an equalized image. A high resolution image is generated from the equalized image. A low resolution image is generated from the high resolution image and a color transform is applied to the low resolution image to produce a color transform image. A logarithmic transform is then applied to the color transformed image to produce a logarithmic transform image. The logarithmic transform image is transformed to produce a color separation space, and balance positions are determined from the color separation space. Balance gains using the color separation space are computed and applied to the original image to produce a balanced image.

Figure 1:
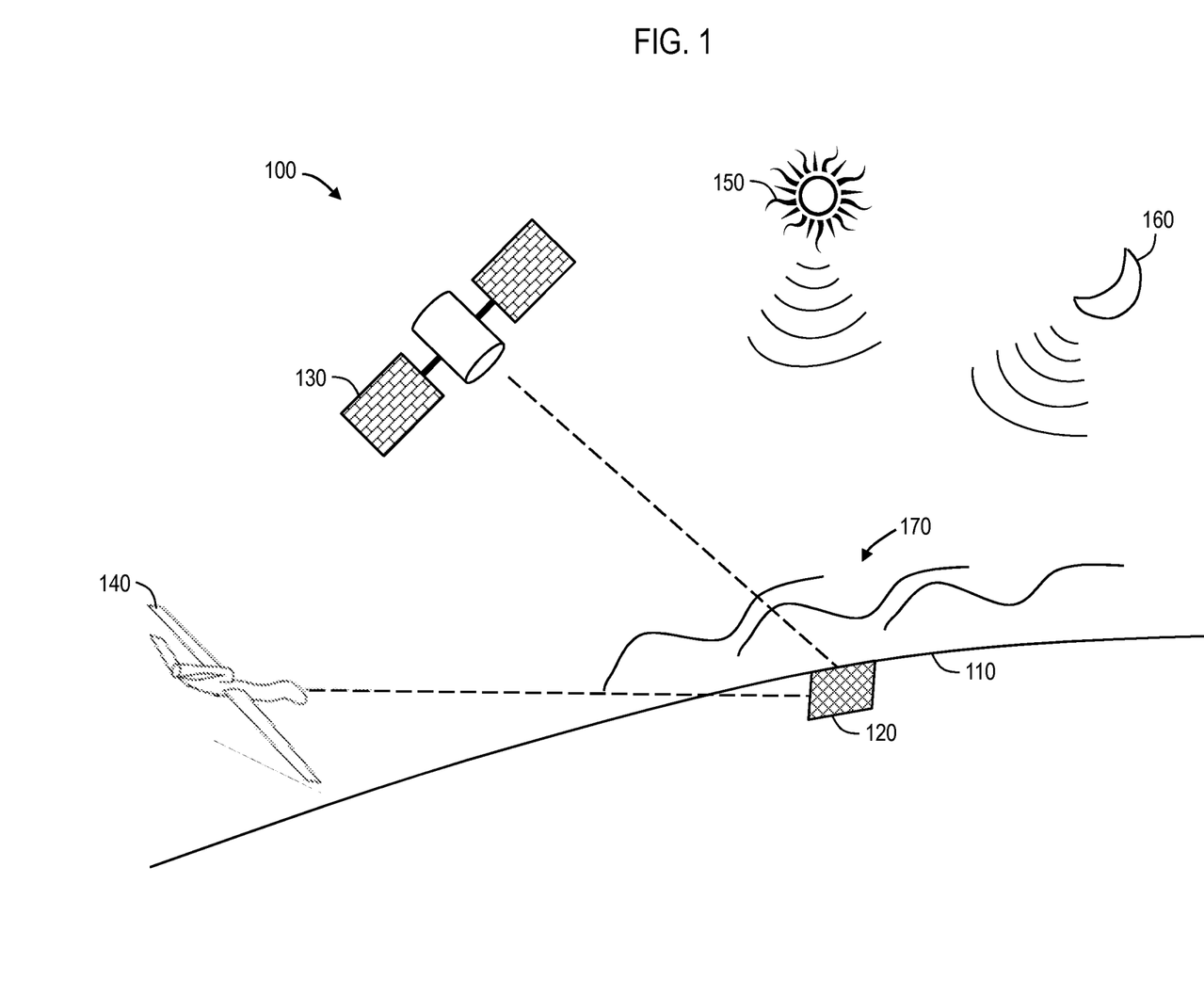
FIG. 1 generally illustrates an environment in which remote imaging devices process images in accordance with an embodiment of the invention.

Referring to FIG. 1, an environment 100 is shown in which remote imaging devices process images in accordance with an embodiment of the invention. Environment 100 illustrates the Earth's surface 110, a target image area 120, a satellite 130, and an unmanned aerial vehicle (UAV) 140. The satellite 130 and UAV 140 are provisioned with imaging equipment and optionally with image processing equipment. In this regard, both the satellite 130 and UAV 140 are remotely imaging target 120 as viewed in FIG. 1. As used herein, the term "remote" generally indicates a distance from an image target that is beyond the range of a commercially available imaging device, e.g., a handheld camera. However, the techniques described herein need not be limited to remotely obtained images. Target 120 may be illuminated during the day by the Sun 150 or at night by the Moon 160. Additional illumination may be provided by outdoor illumination, e.g., street lights. The light received by satellite 130 and UAV 140 from target 120 is affected by atmospheric effects 170, e.g., clouds, rain, fog, dust, pollution, variations in air density due to thermal effects, etc.

The satellite 130 and UAV 140 are equipped with cameras or other equipment to image target 120. The images may be captured at different times of day. Accordingly, the scene illumination intensity will change from dawn to noon, from noon to dusk, and on into the evening hours. Not only does the scene illumination intensity change, but the color or light temperature of the illumination changes. For example, sunlight is more yellow at noon and more orange-to-red toward sunset. Furthermore, atmospheric effects 170 introduce additional distortion to the images that should be compensated for during image processing.

Figure 2A:
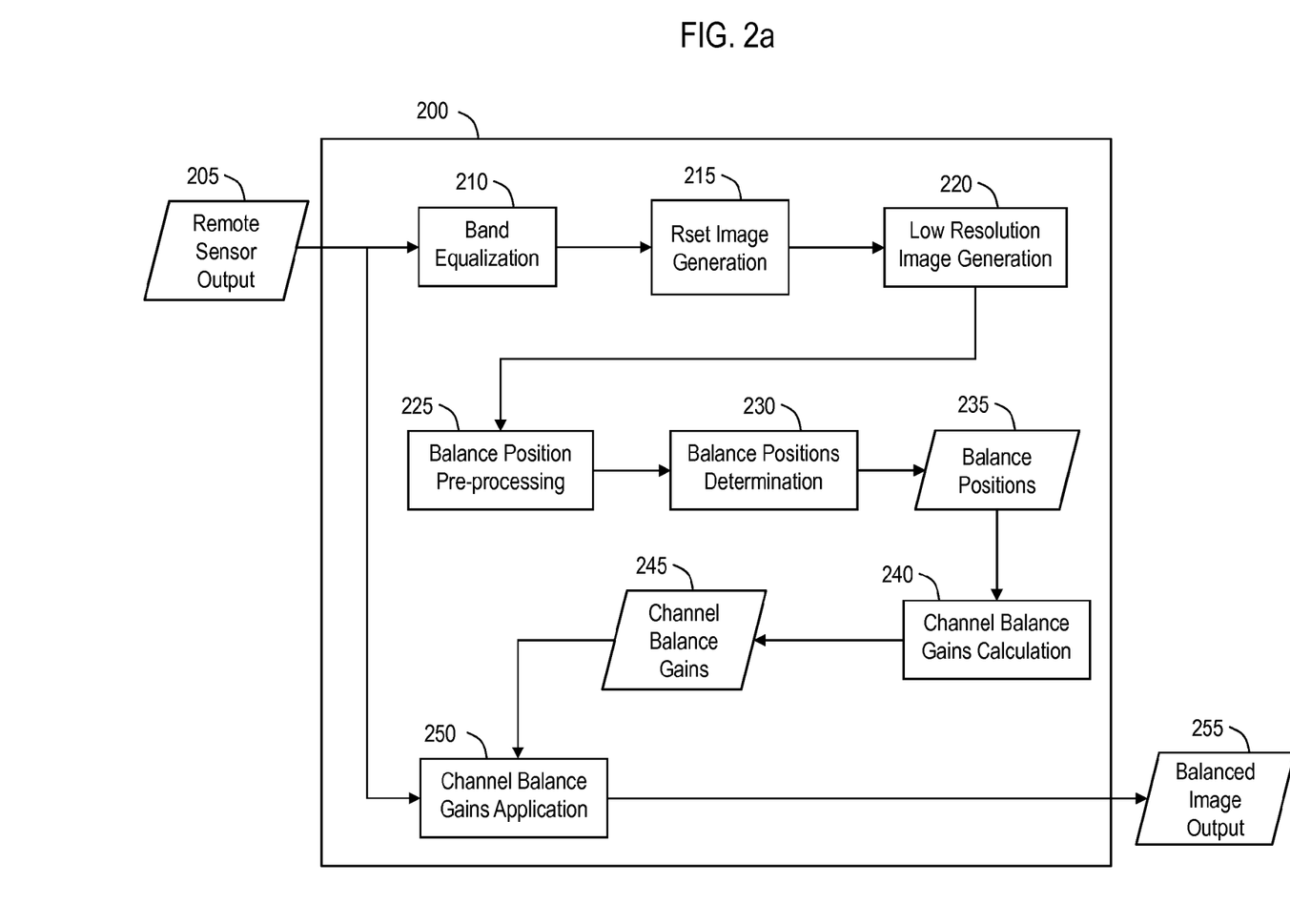
FIG. 2a is a schematic block diagram of functional modules for an in-scene image balancing process in accordance with an embodiment of the invention.

Referring to FIG. 2, a functional block diagram is described to illustrate an in-scene image balancing process. A signal processing module 200 is provided that receives remote sensor image output data 205, processes the remote sensor output 205, and generates balanced image output 255. The signal processing module 200 has a band equalization unit or module 210, a result set image generation module 215, a low resolution image generation module 220, a balance position pre-processing module 225, a balance position determination module 230, a channel balance gains calculation module 240, and a channel balance gains application module 250. The term "channel" generally refers to a specific frequency band or spectral sensitivity band. It should be noted that the signal processing module 200 may reside with satellite 130 or UAV 140, or be ground based, as in an image processing facility that receives images and image metadata from the remote sensor.

The balance position determination module 230 outputs balance positions data 235 used as an input to the channel balance gains calculation module 240. The channel balance gains calculation module 240 outputs channels balance gains data 245 used as an input to the channel balance gains application module 250. The channel balance gains application module 250 outputs the balanced image 255. Each of the modules and data blocks will be described in greater detail hereinafter.

The remote sensor output 205 is image or video data that has been captured by a remote sensor, e.g., satellite 130 or UAV 140, or other remote imaging device. For example, when imaging target 120 (FIG. 1), the remote sensor will capture images accordingly to its sensor's spectral capability or sensitivity, e.g., RGB or CMY. Some image processing takes place as the data are produced and stored. Along with the image data, the remote sensor may store metadata that can be used as an aid to image processing by band equalization module 210. Example metadata for a WorldView 2 satellite image is provided in Table 1 below:

TABLE 1

| Band Equalization Metadata for WorldView 2 | | |
|---|---|---|
| Band | AbsCalFac | EffBW |
| Coastal | 0.0093 | 0.0473 |
| Blue | 0.00729 | 0.0543 |
| Green | 0.00971 | 0.063 |
| Yellow | 0.0051 | 0.0374 |
| Red | 0.01852 | 0.0574 |

Table 1 shows the absolute values of calibration factors (AbsCalFac) and the corresponding effective bandwidth (EffBW) for five wavelength bands in the visible range. The coastal band operates at a wavelength of 400-450 nanometers (nm), the blue band operates at wavelengths from 450-510 nm, the green band operates at wavelengths from 510-580 nm, the yellow band operates at wavelengths from 585-625 nm, and the red band operates at wavelengths from 630-690 nm. WorldView 2 also provides panchromatic (PAN), red edge (705-745 nm), near infrared (NIR) band 1 (770-895 nm), and NIR band 2 (860-1040 nm). The PAN, red edge, NIR 1, and NIR 2 bands are omitted for ease of illustration.

When a satellite takes images, the position of the satellite, the image target, and the Sun determine the amount of sunlight (solar spectral irradiance) that is reflected by the atmosphere back into to the satellite camera. In other words, all of the bodies involved are moving, rotating, or orbiting, and the brightness and angle of the sunlight, when viewed from the satellite, changes accordingly. The digital image values provided by the satellite may be compensated with factory tuned calibration factors that account for camera defects and digital conversion (e.g., analog-to-digital (A/D) conversion), and may be referred to as relative radiance values.

The AbsCalFac further accounts for exposure and is conversion factor that converts the relative radiance values in an image file into corresponding absolute radiance values, measured in watts/square-meter/steradian. The absolute radiance values can be used to compare images from other sensors. The EffBW is associated with the absCalFactor and is used to calculate a common atmospheric point of reference (e.g., a top-of-atmosphere spectral radiance) that further enhances the quality of the image.

The AbsCalFac and the EffBW are provided on a per image basis. The AbsCalFac and the EffBW are combined to form the gain factors (e.g., Gain=AbsCalFac÷EffBW). The application of these gain factors on a per band basis enables the scene to be equalized across the bands, and produces a more optimal image than that produced using traditional techniques. Band equalization produces a more optimal image from remotely sensed or aerial multiband imagery due to the manner in which the image processing algorithm as a whole operates. The image processing algorithm has to separate the color of the illuminant, e.g., the Sun, from the color of the scene, e.g., target 120. When the bands of the imagery are not equalized, the color separation is not obtained that is needed in order for the balance position pre-processing module 225 and the balance position determination module 230 to produce the proper balance positions 235.

Once band equalization module 210 finishes band equalization, Reduced Resolution Data Sets (RRDS; $R_{sets}$) are created in module 215. When $R_{sets}$ are created there are usually eight (8) $R_{sets}$ that are generated, R0-R7. R0 is the full resolution image, R1 is an image that has ½ the resolution of the full resolution image, R2 is an image with ¼ of the resolution of the full resolution image, etc., until R8 which is 1/128 of the resolution of the full resolution image. According to the techniques described herein, a determination was made, that under most circumstances, R3 is the most appropriate $R_{set}$ to use for remotely sensed imagery. R3 represents an image that is ⅛ the resolution of the full resolution image.

Figure 3:
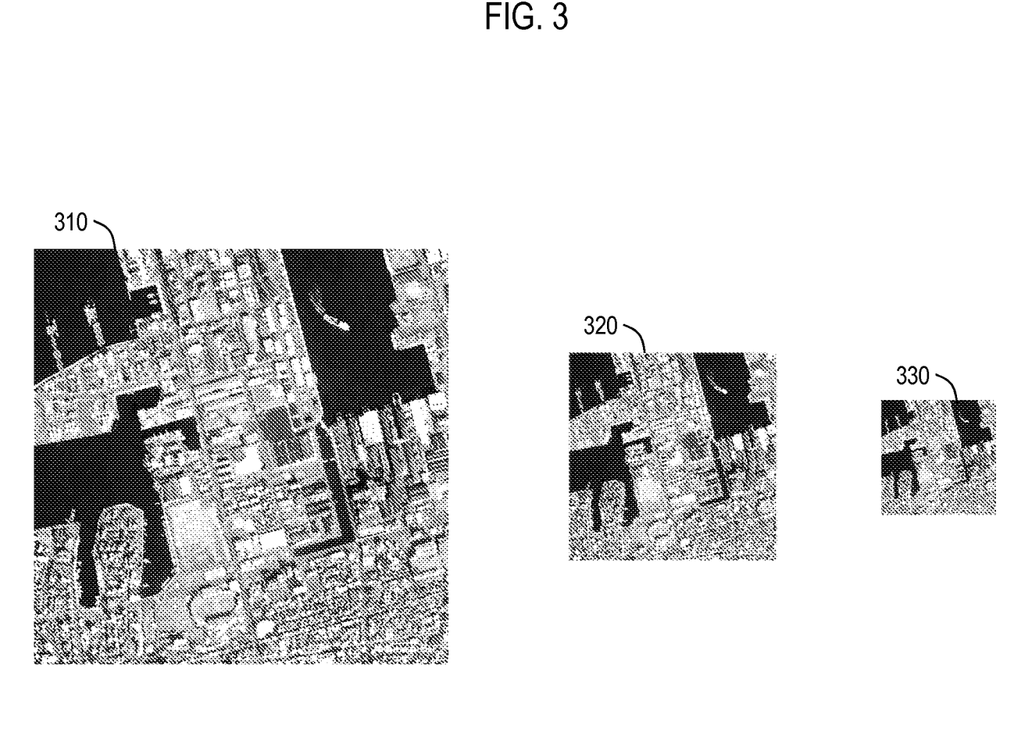
FIG. 3 generally illustrates high resolution images generated in accordance with an embodiment of the invention.

The $R_{set}$ image is a quantized image that keeps the original scene content intact as well provides very good correlation to the original image statistics. Prior techniques create a low resolution image from the original image by using the full resolution image. However, when working with remotely sensed or aerial imagery, the size of the full resolution file does not lend itself to producing good results when the low resolution image is derived directly from the full resolution image. In this disclosure, the use of R3 provide a much better statistical representation of the original scene while at the same time providing an image that can be further reduced in resolution as required by the balance algorithm. Example $R_{set}$ images are depicted in FIG. 3. At 310, a full resolution image is shown. At 320, a one-half resolution $R_{set}$ image is shown, and at 330, a one-quarter $R_{set}$ image is shown.

Referring again to FIG. 2a, the low resolution image generation module 220 generates a low resolution image (from the higher resolution $R_{set}$ image) that is fed to balance position pre-processing module 225. The low resolution image may be a paxelated image. In connection with FIG. 2b, the balance position pre-processing module 225 is described in greater detail. The balance position pre-processing module 225 is further defined by color transformation application unit or module 225(1), logarithmic transformation application module 225(2), and color space conversion module 225(3).

Figure 2B:
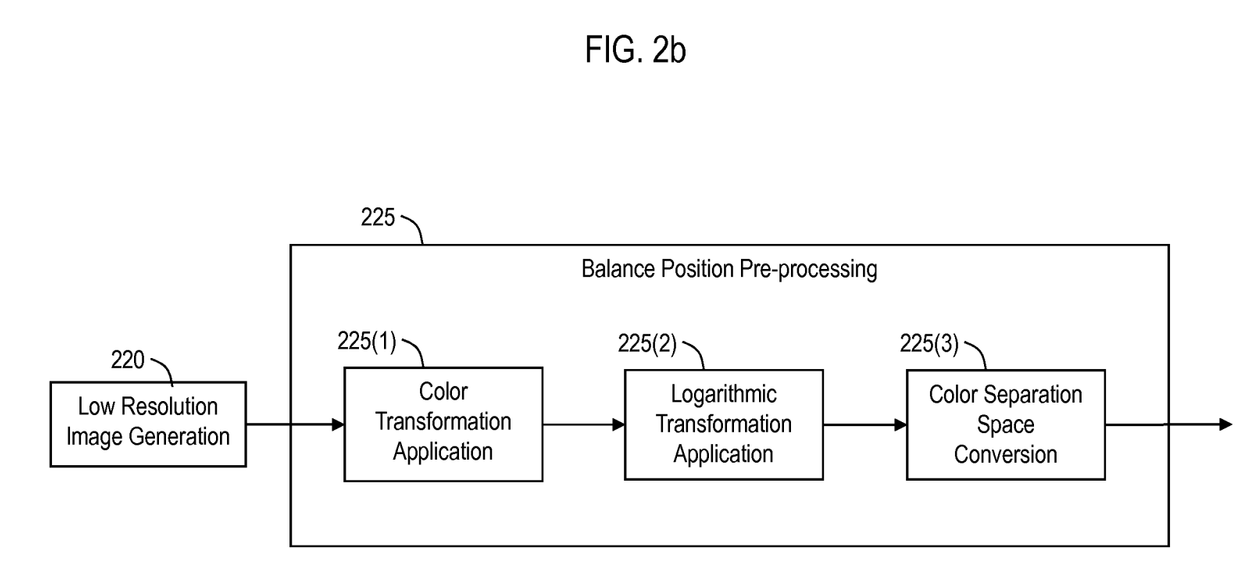

The low resolution image is then prepared by pre-processing module 225 such that the separation of the captured bands is enabled to produce image balance positions that are used by channel balance gains calculation module 240 to ultimately balance the image. This preparation includes transforming the low resolution image into a color space that separates the RGB channels into U-space coordinates, e.g., per equation (4) below. In this space the determination of the color of the illuminant and the color of the scene can be more easily statistically segmented. On one axis is the green-magenta color combination and on the other axis is the red-blue color combination. To further help in the segmentation that RGB data is shifted via a logarithmic function. In order to produce the balance positions by balance position determination module 230, the image bands are transformed such that the illuminant of the scene can be distinguished from the scene data, as described above.

Color transformation application module 225(1) transforms the image color space to a desired color space. By way of example, RGB images do not separate luminance components from chrominance components, while hue, saturation, and intensity (HSI), or luminance (Y) and chrominance (UV/CbCr/PbPr) color spaces provide such separation.

For example, RGB to YUV conversion can be performed using the following equations:

$$Y=0.299R+0.587G+0.114B$$

$$U=0.492(B-Y)$$

$$V=0.877(R-Y) \quad (1)$$

The coefficients in equations (1) are examples for common implementations and may vary depending on the equipment used and design constraints.

RGB to HSI conversion can be performed using the following equations:

$$I=(R+G+B)/3$$

$$S=1-(3/(R+G+B))\times a, \text{ where } a=\min(R,G,B)$$

$$H=\cos^{-1}((0.5\times((R-G)+(R-B)))/((R-G)^2+(R-B)\times(G-B))^{1/2}) \quad (2)$$

If (B/I)>(G/I), then H=360-H, H in degrees H can then be normalized from zero to one, i.e., H=H/360, or normalized according to the number of bits used in the digital representation of H. S and I can also be normalized according to the number of bits used in the digital representation.

In alternate form, the color transform equations may be reduced to matrix form. The application of the color transformation may be performed via an N×M matrix that will take the input band values and rotate them to a color space that defines the input metric of the captured data. This rotation is needed because the human visual system "sees" color differently from the manner in which a capture device "sees" color. In order to ensure that the balance positions that are calculated are as optimal as possible, the rotation into a space that is correlated to the human visual system is needed. Equation (3) provides an example matrix that can be used for this conversion.

$$\begin{bmatrix} Rrot \\ Grot \\ Brot \end{bmatrix} = \begin{bmatrix} 0.4682 & 0.4837 & 0.0068 \\ 0.1656 & 0.9137 & -0.0773 \\ 0.0386 & -0.2281 & 1.0064 \end{bmatrix} \begin{bmatrix} Rcap \\ Gcap \\ Bcap \end{bmatrix} \quad (3)$$

Figure 4A:
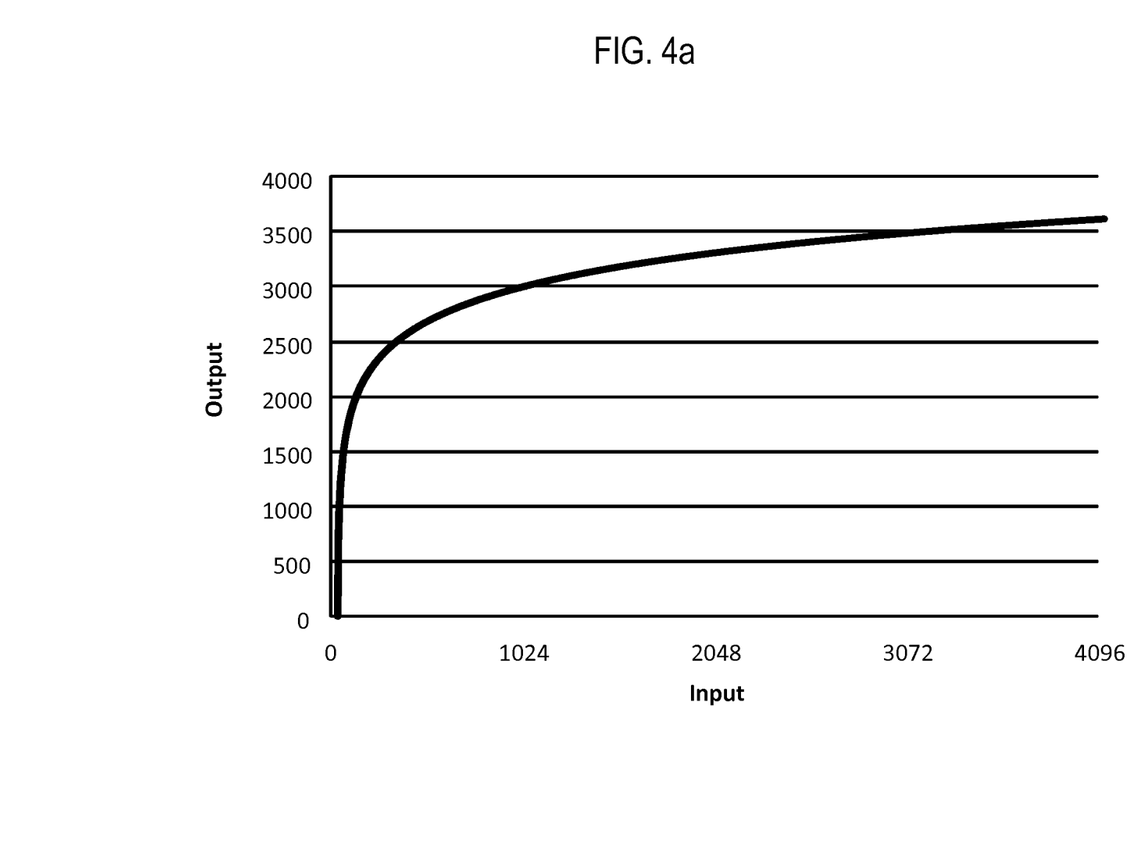
FIG. 4a is a graph of a logarithmic transform used to process image data in accordance with an embodiment of the invention.

The matrix in equation (3) is type of matrix can be determined by having some ground truth data and performing a linear regression to minimize the error between the truth data and a representation of the analytical data produced from a model of what the image capture device would produce, i.e., Rcap, Gcap, and Bcap, or RGBcap for short. It should be noted that although Equation (3) depicts a color rotation for RGB, other color spaces with their corresponding rotations may be used. After transforming the data into the color space rotated into by the N×M matrix, a logarithmic transformation is then applied to the imagery by logarithmic transformation application module 225(2). The logarithmic transformation prepares the image for the subsequent conversion to the color space used to separate illuminant color from scene color. An example of a logarithmic transformation that can be used is shown in FIG. 4.

By way of example, the values of Rrot, Grot, and Brot from Equation (3) are transformed into values of Rtransform, Gtransform, and Btransform by the transformation provided in FIG. 4. Once the transform from FIG. 4 is complete, a further logarithm of each value is taken such that Rlog, Glog, and Blog are generated. In other words, Rlog=log(Rtransform), Glog=log(Gtransform), and Blog=log(Btransform).

Once the logarithm of each transformation is applied to the imagery, the conversion to the separation space is then accomplished by color space conversion module 225(3). There are many spaces that the imagery can be converted to in order to provide a space for separation. In some cases, it is desirable to use a standard color space having a luminance channel and two color-difference channels. Examples of such color spaces include Photo YCC and YCrCb. One particular color space of this type involves calculating three channels or bands using equations (4):

$$N = (R_{Log} + G_{Log} + B_{Log})/3$$

$$GM = (2G_{Log} - R_{Log} - B_{Log})/4$$

$$Ill = (B_{Log} - R_{Log})/2 \quad (4)$$

where $R_{Log}$, $G_{Log}$, and $B_{Log}$ are the logarithms of the linear standard RGB color space values. In this case, N is the luminance channel, GM is a color difference channel in a green-magenta direction, and ILL is a color difference channel in the blue-red direction and generally lines up with the direction in which typical scene illuminants vary.

Equations 4 can be converted to matrix form for ease of computation as shown in Equation (5).

$$\begin{bmatrix} N \\ GM \\ Ill \end{bmatrix} = \begin{bmatrix} 0.333 & 0.333 & 0.333 \\ -0.25 & 0.500 & -0.25 \\ -0.50 & 0.000 & 0.500 \end{bmatrix} \begin{bmatrix} R \\ G \\ B \end{bmatrix} \quad (5)$$

Referring again to FIG. 2a, the balance positions are determined by balance position determination module 230 from the N-GM-Ill separation space (i.e., the U-space). In module 230 inverse processing is done in order to determine the balance positions that will be in the proper color space for application to the imagery. The balance positions are determined using known techniques.

The inverse processing generates an RGB space that corresponds to the color space of the image capture device. In order to perform the inverse processing, two functions are performed. The first function is to convert the U-space into the RGB color space. The inverse conversion is performed using the inverse matrix show in Equation 6.

$$\begin{bmatrix} R \\ G \\ B \end{bmatrix} = \begin{bmatrix} 1.000 & -0.667 & -1.000 \\ 1.000 & 1.333 & 0.0000 \\ 1.000 & -0.667 & 1.000 \end{bmatrix} \begin{bmatrix} N \\ GM \\ Ill \end{bmatrix} \quad (6)$$

Figure 4B:
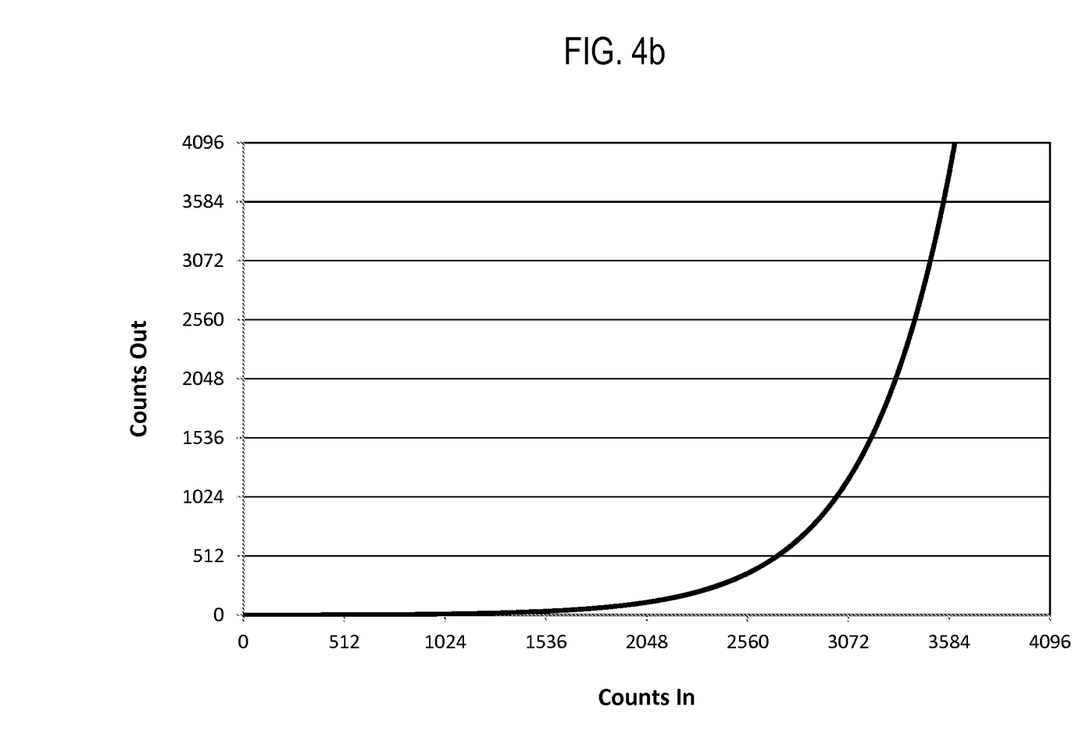

The second function is to linearize the RGB values by going through an inverse logarithmic function, e.g., that may be a look-up table that may be derived from FIG. 4b. The logarithmic transform shown in FIG. 4b is the inverse of the transform shown in FIG. 4a.

The balance positions are reported as spatial locations on the axes of the transformed color space, as is known in the art. These balance positions are then converted to an RGB triplet for determination of the channel balance gains 245 by channel balance gains calculation module 240. In module 240 the balance positions are converted to a gain by selecting the maximum value of the RGB triplet and then calculating a ratio of the maximum value of the triplet divided by the individual values of the triplet. This will ensure that one of the gains is always equal to 1.0 while the others are values greater than 1.0. The balance gains are used to balance the original input image 205 by balance gains application module 250, as depicted in FIG. 2a. Module 250 applies the gains calculated in module 250 by multiplying the appropriate R, G or B channel by the corresponding calculated gain. With the application of these channel gains, the image is now balanced such that the neutrality of the image is representative of the actual scene. After the balance gains are applied to the input image, the balanced image is then scaled to the appropriate bit depth and written out to disk for subsequent usage as shown at 255.

The various modules in FIGS. 2a and 2b are illustrated as separate functional blocks for purposes of description. It will be appreciated that the operations performed within these blocks can be performed in any combination of hardware and/or software and need not be performed via separate modules, equipment, or software (e.g., all of the computations can be performed by running software on a processor). The techniques described herein can be performed as a continual process which operates on series of input images on an ongoing basis.

Figure 5:
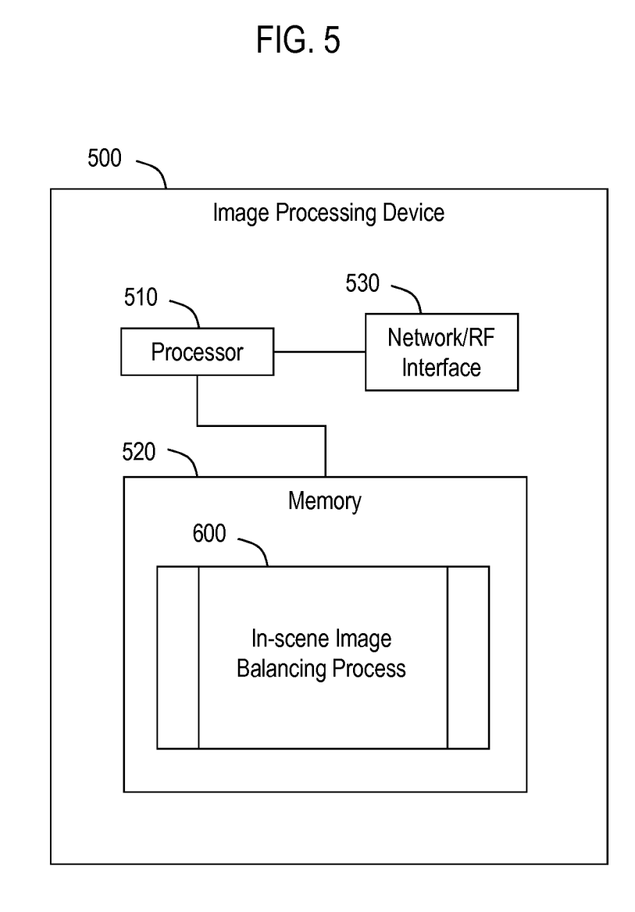
FIG. 5 is a schematic block diagram of an exemplary image processing device in accordance with an embodiment of the invention.

Turning now to FIG. 5, a block diagram of an image processing device 500 which is configured to perform and in-scene image balancing process 600 is depicted. The in-scene image balancing process 600 generally follows the techniques described in connection with FIGS. 2a and 2b. The video image processing device 500 comprises a data processing device 510, an interface module 530, and a memory 520. Resident in the memory 520 is software configured to execute in-scene image balancing process 600. The image processing device 500 and process 600 may also be implemented entirely in software and executed on available commercial off-the-shelf computing equipment.

The data processing device 510 may be a microprocessor, microcontroller, systems on a chip (SOCs), or other fixed or programmable logic. The memory 520 may be any form of random access memory (RAM) or other data storage block that stores data used for the techniques described herein. The memory 520 may be separate or part of the processor 510. Instructions for performing the process 600 may be stored in the memory 520 for execution by the processor 510. The interface unit 530 enables communication between the image processing device 500 and other network elements (not shown) and may also include a radio frequency (RF) transceiver interface for communicating with remote sensing equipment, e.g., satellite 130 and UAV 140 (FIG. 1).

The functions of the processor 510 may be implemented by a processor readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 520 stores data used for the computations or functions described herein (and/or to store software or processor instructions that are executed to carry out the computations or functions described herein). Thus, the process 600 may be implemented with fixed logic or programmable logic (e.g., software or computer instructions executed by a processor or field programmable gate array (FPGA)).

Figure 6A:
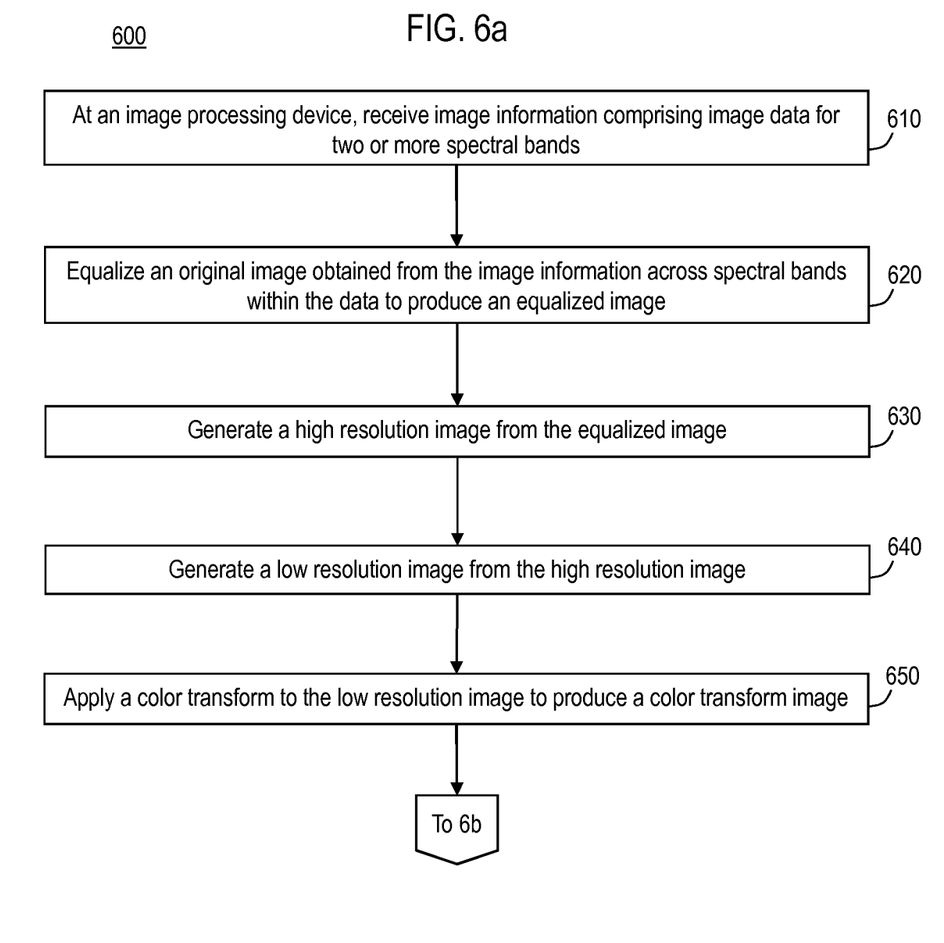
FIGS. 6a and 6b is a flow diagram of a general example of an in-scene image balancing process in accordance with an embodiment of the invention.
Figure 6B:
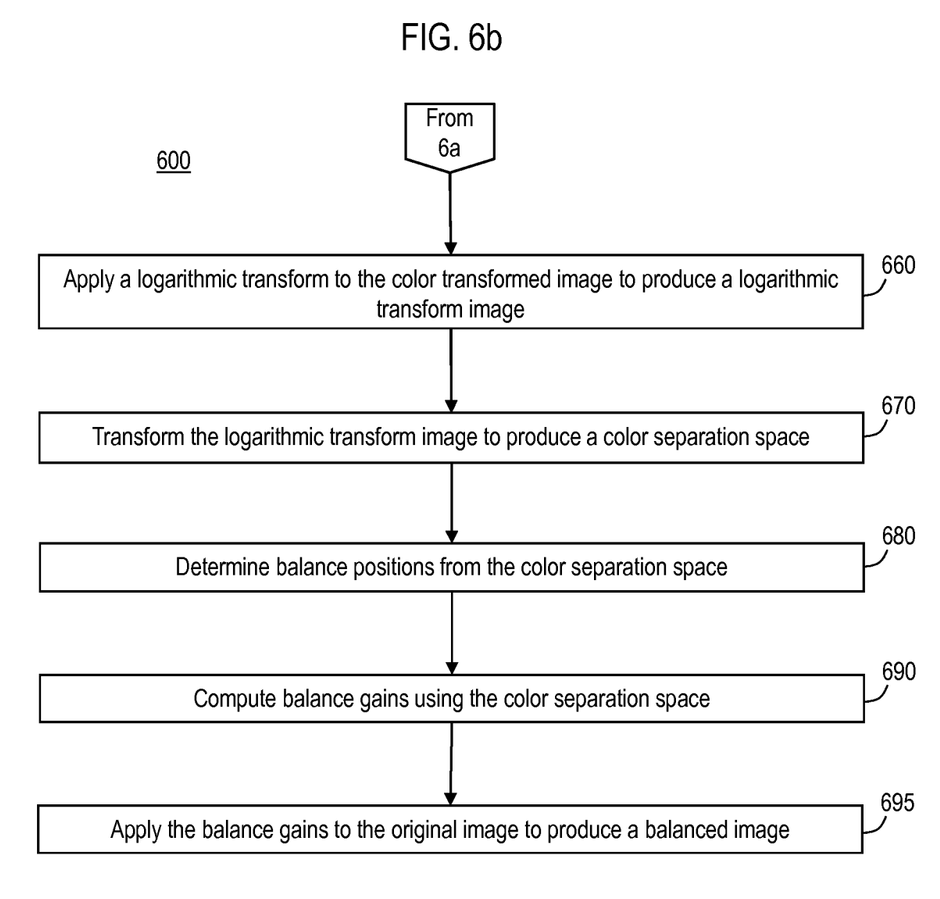

Referring to FIGS. 6*a* and 6*b*, a flow diagram of a general example of the in-scene image balancing process 600 is now described. At 610, an image processing device is configured to receive image information comprising image data for two or more spectral bands. At 620, an original image is obtained from the image information and equalized across spectral bands to produce an equalized image. At 630, a high resolution image is generated from the equalized image. At 640, a low resolution image is generated from the high resolution image, and at 650, a color transform is applied to the low resolution image to produce a color transform image, e.g., RGBcap→RGBrot. The in-scene image balancing process 600 continues on FIG. 6*b*.

At 660, a logarithmic transform is then applied to the color transformed image to produce a logarithmic transform image, e.g., RGBrot→RGBtransform→RGBlog. At 670, the logarithmic transform image is transformed to produce a color separation space, RGBlog→U-space. At 680, balance positions are determined from the color separation space. At 690, balance gains using the color separation space are computed, and at 695, applied to the original image to produce a balanced image. The balanced image is then saved to a disc, database, or other storage media. The balance image may be further processed for display on a video monitor of for image printout as a hard copy.

It is important to understand that the invention described herein involves a technique for generating a balanced image that first performs spectral band equalization and then generates or produces a high resolution image that represents the original image, but does so using a lesser amount of data. Further, the above described techniques eliminate the need for a look-up table and the associated transformation that is usually applied to the original image prior to applying the balance gains to the original image.

The techniques provided herein account for sensor, optics, illumination, scene content, as well as the effects of human perception, to produce an image that ha proper neutral balancing. Further, it should be understood that the technique are operative in the digital count (digital representations of pixel brightness) space and not in the radiance space. There is a linear relationship between radiance and digital counts.

Having described preferred embodiments of new and improved methods and apparatus for determining the angles of arrival of signals incident on an antenna array, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus comprising:
   a receiver configured to receive image information comprising image data for two or more spectral bands; and
   a processor comprising:
      a band equalization module configured to equalize an original image obtained from the image information across spectral bands within the data using a gain factor for each set of image data associated with a given spectral band of the two or more spectral bands to produce an equalized image to facilitate color separation of one or more illuminants of the scene;
      a channel balance gains calculation module configured to compute a balance gain for each spectral band in the equalized image; and
      a channel balance gains application module configured to apply the balance gain for each spectral band to the original image to produce a balanced image such that the neutrality of the balanced image is representative of the scene.

2. The apparatus of claim 1, wherein the processor further comprises:
   a high resolution image generation module configured to generate a high resolution image from the equalized image prior to computing the balance gain for each spectral band.

3. The apparatus of claim 2, wherein the processor further comprises:
   a low resolution image generation module configured to generate a low resolution image from the high resolution image prior to computing the balance gain for each spectral band.

4. The apparatus of claim 3, wherein the processor further comprises:
   a balance position pre-processing module configured to generate a color separation space from the low resolution image.

5. The apparatus of claim 4, wherein the processor further comprises:
   a balance position determination module configured to determine balance positions from the color separation space.

6. The apparatus of claim 5, wherein the balance position pre-processing module further includes:
   a color transform module configured to apply a color transform to the low resolution image to produce a color transform image;
   a logarithmic transform module configured to apply a logarithmic transform to the color transformed image to produce a logarithmic transform image; and
   a color separation space module configured to transform the logarithmic transform image to produce the color separation space, wherein the channel balance gains calculation module computes the balance gains using the color separation space.

7. The apparatus of claim 6, wherein the balance position determination module is further configured to:

convert the color separation space into red-green-blue (RGB) triplets, wherein the channel balance gains calculation module computes the balance gains using the RGB triplets.

8. The apparatus of claim 1, further comprising an interface configured to output the balanced image.

9. A method comprising:
at an image processing device, receiving image information comprising image data for two or more spectral bands;
equalizing an original image obtained from the image information across spectral bands within the data using a gain factor for each set of image data associated with a given spectral band of the two or more spectral bands to produce an equalized image to facilitate color separation of one or more illuminants of the scene;
computing a balance gain for each spectral band in the equalized image; and
applying the balance gain for each spectral band to the original image to produce a balanced image such that the neutrality of the balanced image is representative of the scene.

10. The method of claim 9, further comprising:
generating a high resolution image from the equalized image prior to computing the balance gain for each spectral band.

11. The method of claim 10, further comprising:
generating a low resolution image from the high resolution image prior to computing the balance gain for each spectral band.

12. The method of claim 11, further comprising:
applying a color transform to the low resolution image to produce a color transform image;
applying a logarithmic transform to the color transformed image to produce a logarithmic transform image;
transforming the logarithmic transform image to produce a color separation space; and
converting the color separation space into red-green-blue (RGB) triplets, wherein the channel balance gains calculation module computes the balance gains using the RGB triplets.

13. The method of claim 9, wherein applying the balance gain includes applying the balance gain without performing a transform parameter look-up and without applying the corresponding transform to the original image.

14. The method of claim 9, further comprising outputting the balanced image.

15. A non-transitory computer readable medium encoded with software comprising processor-executable instructions that, when executed by a processor, cause the processor to perform functions of:
receiving image information comprising image data for two or more spectral bands;
equalizing an original image obtained from the image information across spectral bands within the data using a gain factor for each set of image data associated with a given spectral band of the two or more spectral bands to produce an equalized image to facilitate color separation of one or more illuminants of the scene;
computing a balance gain for each spectral band in the equalized image; and
applying the balance gain for each spectral band to the original image to produce a balanced image such that the neutrality of the balanced image is representative of the scene.

16. The non-transitory computer readable medium of claim 15, further comprising instructions that, when executed by a processor, cause the processor to perform functions of generating a high resolution image from the equalized image prior to computing the balance gain for each spectral band.

17. The non-transitory computer readable medium of claim 16, further comprising instructions that, when executed by a processor, cause the processor to perform functions of generating a low resolution image from the high resolution image prior to computing the balance gain for each spectral band.

18. The non-transitory computer readable medium of claim 17, further comprising instructions that, when executed by a processor, cause the processor to perform functions of:
applying a color transform to the low resolution image to produce a color transform image;
applying a logarithmic transform to the color transformed image to produce a logarithmic transform image; and
transforming the logarithmic transform image to produce a color separation space; and
converting the color separation space into red-green-blue (RGB) triplets, wherein the channel balance gains calculation module computes the balance gains using the RGB triplets.

19. The non-transitory computer readable medium of claim 15, wherein the instructions for applying the balance gain include instruction for applying the balance gain without performing a transform parameter look-up and without applying the corresponding transform to the original image.

20. The non-transitory computer readable medium of claim 15 further comprising instructions that, when executed by a processor, cause the processor to perform functions of generating a high resolution image from the equalized image prior to computing the balance gain for each spectral band.

21. The non-transitory computer readable medium of claim 15 further comprising instructions that, when executed by a processor, cause the processor to perform functions of outputting the balanced image.

* * * * *